(12) United States Patent  
Jeong et al.

(10) Patent No.: US 8,369,813 B2  
(45) Date of Patent: Feb. 5, 2013

(54) APPARATUS AND METHOD FOR REDUCING CROSS-TALK BETWEEN AUDIO CHANNELS IN A MOBILE TERMINAL

(75) Inventors: Sung-Hoon Jeong, Gyeonggi-do (KR); Ki-Won Kim, Seoul (KR); Ju-Hee Chang, Gyeonggi-do (KR); Sung-Hwan Ko, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 351 days.

(21) Appl. No.: 12/849,413

(22) Filed: Aug. 3, 2010

(65) Prior Publication Data

US 2011/0045775 A1    Feb. 24, 2011

(30) Foreign Application Priority Data

Aug. 21, 2009   (KR) .................. 10-2009-0077426

(51) Int. Cl.  
*H04B 1/10* (2006.01)  
*H04B 1/38* (2006.01)

(52) U.S. Cl. ............... 455/295; 455/63.1; 455/67.13; 455/557

(58) Field of Classification Search ........... 455/63.1, 455/67.13, 295, 296, 303, 556.1, 557; 375/346; 381/71.1, 94.1, 94.5, 309, 370, 380  
See application file for complete search history.

(56) References Cited

U.S. PATENT DOCUMENTS 7,664,560 B2 * 2/2010 Lai et al. ............... 700/94  
7,907,095 B2 * 3/2011 Kimura et al. .......... 343/718  
2009/0262970 A1 * 10/2009 Shin et al. .............. 381/384

* cited by examiner

*Primary Examiner* — Quochien B Vuong  
(74) *Attorney, Agent, or Firm* — Cha & Reiter, LLC

(57) ABSTRACT

An apparatus and a method for reducing cross-talk between audio channels in a mobile terminal are provided. The apparatus includes an ear jack, a radio signal tuner, a baseband, and a switching unit. The ear jack includes a common port for a reference potential of an earphone and a radio signal. The radio signal tuner processes a radio signal input via the common port. The baseband determines an on/off state of a radio reception function to output a control signal. The switching unit connects the common port of the ear jack to one of a ground and the radio signal tuner according to the control signal.

6 Claims, 4 Drawing Sheets

APPARATUS AND METHOD FOR REDUCING CROSS-TALK BETWEEN AUDIO CHANNELS IN A MOBILE TERMINAL

CLAIM OF PRIORITY

This application claims the benefit under 35 U.S.C. §119(a) of a Korean patent application filed in the Korean Intellectual Property Office on Aug. 21, 2009 and assigned Serial No. 10-2009-0077426, the entire disclosure of which is hereby incorporated by reference.

BACKGROUND OF THE INVENTION

1. Field of the Invention

The present invention relates to an apparatus and a method for reducing cross-talk between audio channels of a mobile terminal. More particularly, the present invention relates to an apparatus and a method for reducing cross-talk between left audio channel and right audio channel of a mobile terminal equipped with an earphone antenna.

2. Description of the Related Art

Recently, a mobile terminal that supports an earphone antenna, that is, an earphone having a Frequency Modulation (FM) radio antenna function has been developed.

Generally, EAR_COM of a mobile terminal serves as a reference potential with respect to left audio channel and right audio channel of an earphone and must be connected to a ground (GND) of a system. However, since EAR_COM uses the same signal line as a line for an FM radio antenna signal due to limitation in the number of input/output (I/O) port inside the mobile terminal that supports the earphone antenna, EAR_COM is connected to GND via an inductor.

FIG. 1 is a circuit diagram illustrating a mobile terminal that supports an earphone antenna according to the conventional art. As shown in FIG. 1, since the mobile terminal that supports the earphone antenna commonly uses an EAR_COM port and an FM radio antenna (FM_RADIO_ANT) port, EAR_COM is not directly connected to GND 101 but is connected via an inductor 103. Here, ideally, the inductor 103 has resistance of 0 for a Direct Current (DC) and has increasing resistance for an Alternating Current (AC). Accordingly, when the inductor 103 is applied in parallel as illustrated in FIG. 1, a DC-like potential maintains the same potential as GND 101, and an FM radio signal having a frequency ranging from 80 MHz to 110 MHz does not go to GND 101 but is transferred up to an FM signal tuner 105.

However, since the inductor 103 has DC resistance, a mutual interference phenomenon, that is cross-talk between left audio channel and right audio channel is generated which in turn deteriorates stereo performance. FIG. 2 is a view illustrating a case where cross-talk is generated in an earphone antenna connected to the conventional mobile terminal. As illustrated in FIG. 2, a current of an audio signal is input to a (+) port of a left channel (EAR L) 201, passes through a (−) port, and goes to EAR_COM to move a vibrating plate of the earphone. At this point, a current of the audio signal cannot swiftly fall due to the DC resistance component 205 of the inductor connected to EAR_COM, so that a portion of the signal is directed to a right channel (EAR R) 203 causing cross-talk.

As described above, to remove cross-talk between left audio channel and right audio channel of the earphone, an inductor having low DC resistance needs to be used. However, for performance of FM radio reception sensitivity, an inductor having high DC resistance is required.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing cross-talk between audio channels in a mobile terminal.

Another aspect of the present invention is to provide an apparatus and a method for reducing cross-talk between audio channels through switching in a mobile terminal that supports an earphone antenna.

Still another aspect of the present invention is to provide an apparatus and a method for directly connecting an EAR_COM port to GND in a mobile port that supports an earphone antenna and commonly uses the EAR_COM port and an FM radio antenna port.

In accordance with an aspect of the present invention, an apparatus for reducing cross-talk between audio channels in a mobile terminal includes an ear jack including a common port for a reference potential of an earphone and a radio signal, a radio signal tuner for processing a radio signal input via the common port, a baseband for determining an on/off state of a radio reception function to output a control signal, and a switching unit for connecting the common port of the ear jack to one of a ground and the radio signal tuner according to the control signal.

In accordance with another aspect of the present invention, a method for reducing cross-talk between audio channels in a mobile terminal includes determining an on/off state of a radio reception function, and connecting a common port of an ear jack to one of a ground and a radio signal tuner for processing a radio signal according to an on/off state of the radio reception function, wherein the common port is intended for a reference potential of an earphone and radio signal reception.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent to those skilled in the art from the following description taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents. Further, it is to be understood that the singular forms "a," "an," and "the" include plural referents unless the context clearly dictates otherwise. Thus, for example, reference to "a component surface" includes reference to one or more of such surfaces.

Figure 1:
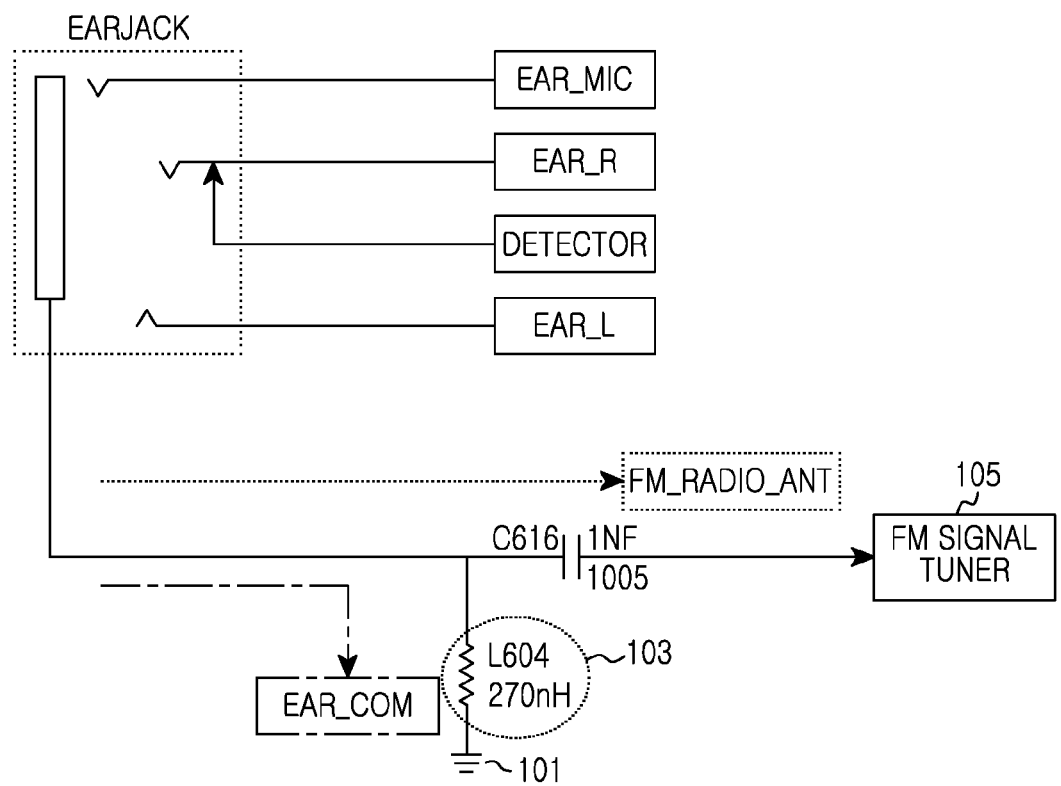
FIG. 1 is a circuit diagram illustrating a mobile terminal that supports an earphone antenna according to the conventional art.
Figure 2:
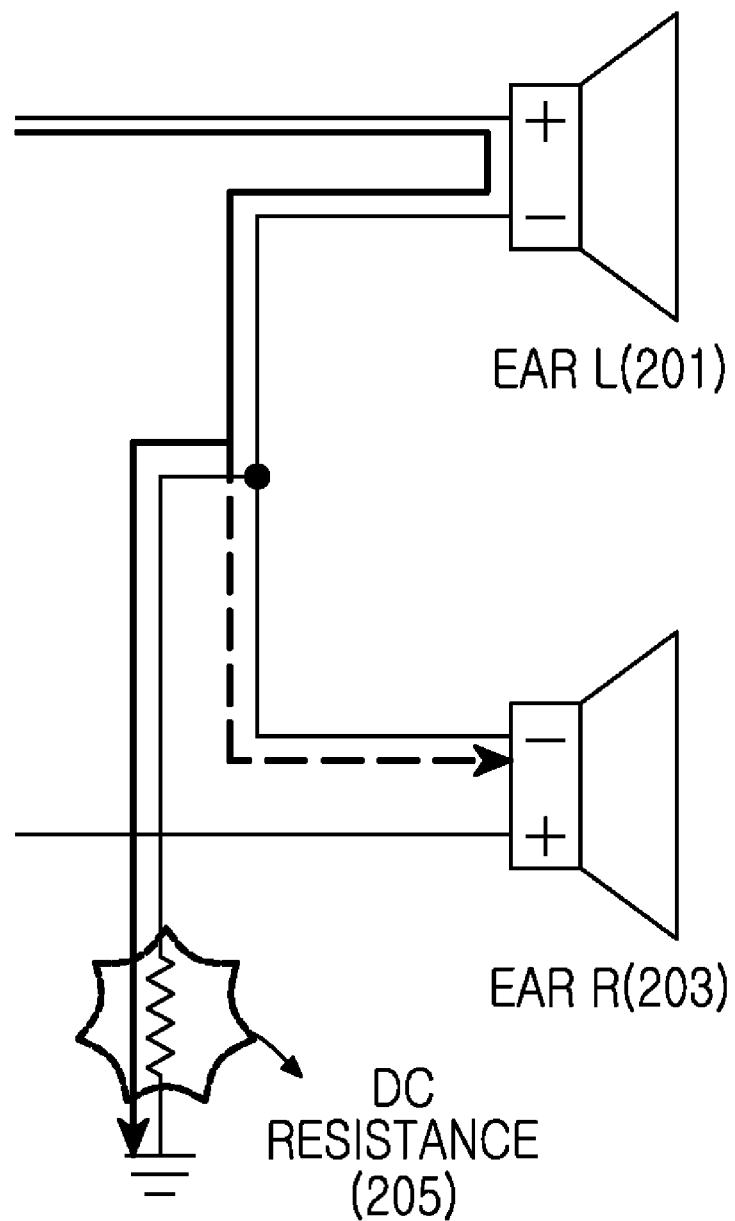
FIG. 2 is a view illustrating a case where cross-talk is generated in an earphone antenna connected to the conventional mobile terminal.
Figure 3:
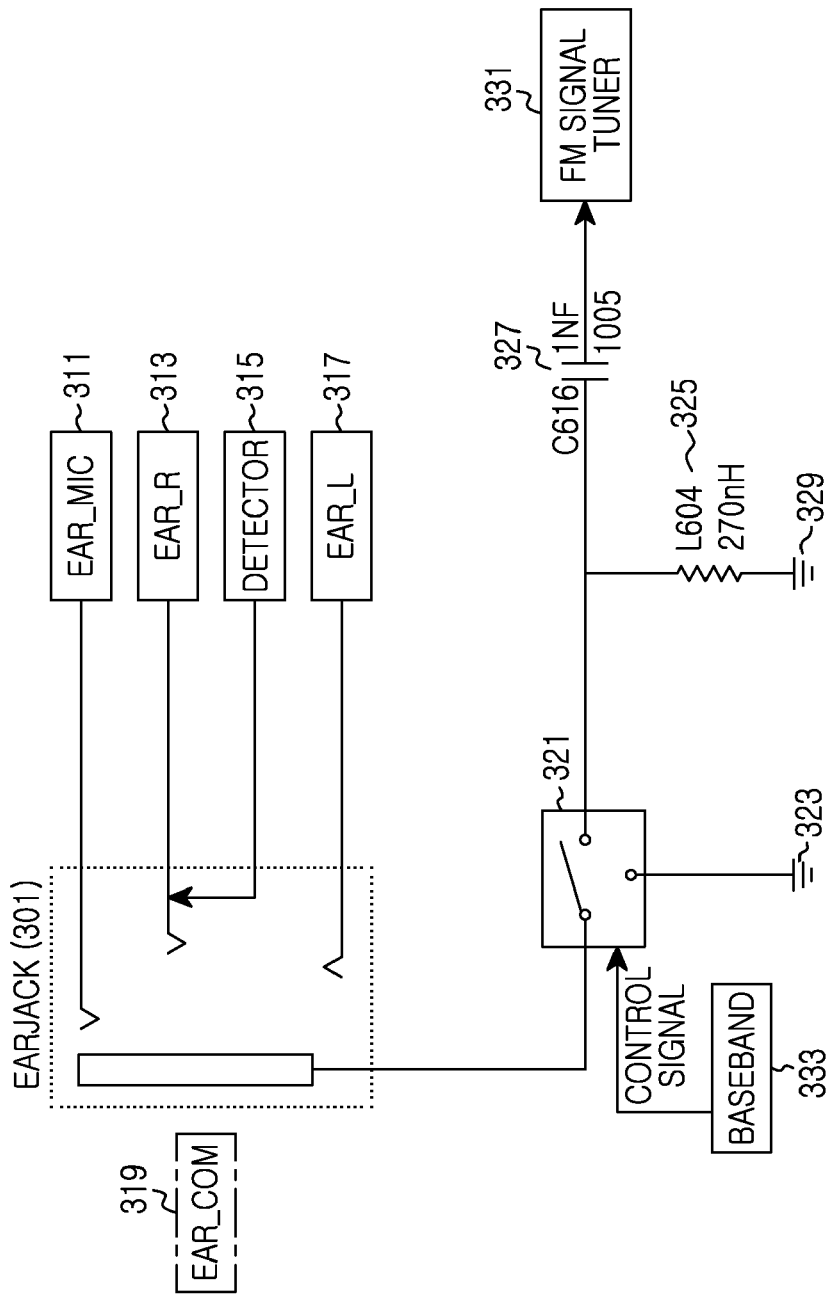
FIG. 3 is a circuit diagram illustrating a mobile terminal that supports an earphone antenna according to an exemplary embodiment of the present invention.

FIG. 3 is a circuit diagram illustrating a mobile terminal that supports an earphone antenna according to an exemplary embodiment of the present invention.

Referring to FIG. 3, the mobile terminal includes an ear jack 301, EAR_MIC 311, EAR_R 313, EAR_L 317, a detector 315, EAR_COM 319, a switching unit 321, GND 323 and 329, an inductor 325, a capacitor 327, an FM signal tuner 331, and a baseband 333.

First, the ear jack 301 connects the mobile terminal with the earphone antenna, transfers an audio signal input from the earphone antenna to EAR_MIC 311, and transfers an audio signal output from EAR_R 313 AND EAR_L 317 to the earphone antenna when the earphone antenna is inserted. In addition, the ear jack 301 transfers an FM radio signal provided from the earphone antenna to an FM signal tuner 331 via the switching unit 321. Here, an EAR_COM port, which serves as a reference potential with respect to the left audio channel and right audio channel of the earphone, and an FM radio antenna port are commonly coupled with the switching unit 321.

EAR_MIC 311 processes an audio signal input from the earphone antenna, EAR_R 313 and EAR_L 317 process left and right audio signals to be output to the earphone antenna, and the detector 315 detects whether the earphone antenna has been inserted to the ear jack 301, and provides a result thereof to the baseband 333.

The switching unit 321 performs switching according to a control signal provided from the baseband 333, provides an FM signal input from the earphone antenna via the ear jack 301 to the FM signal tuner 331, or directly connects EAR_COM 319 with GND 323. That is, when a control signal representing use of an FM radio antenna is input from the baseband 333, the switching unit 321 performs switching such that an FM signal input from the earphone antenna via the ear jack 301 is provided to the FM signal tuner 331. In contrast, when a control signal representing non-use of the FM radio antenna is input from the baseband 333, the switching unit 321 performs switching such that EAR_COM 319 is directly connected with GND to reduce cross-talk between left audio channel and right audio channel.

The FM signal tuner 331 down-converts an FM radio signal input from the earphone antenna via the ear jack 301 to provide the same to the baseband 333.

The baseband 333 determines an on/off of an FM radio reception function and outputs a corresponding control signal to the switching unit 321 depending on the determination result. That is, when the FM radio reception function is turned on by a user, the baseband 333 outputs a control signal representing use of an FM radio antenna to the switching unit 321. When the FM radio reception function is turned off by the user, the baseband 333 outputs a control signal representing non-use of the FM radio antenna to the switching unit 321 to induce switching of the switching unit 321.

Figure 4:
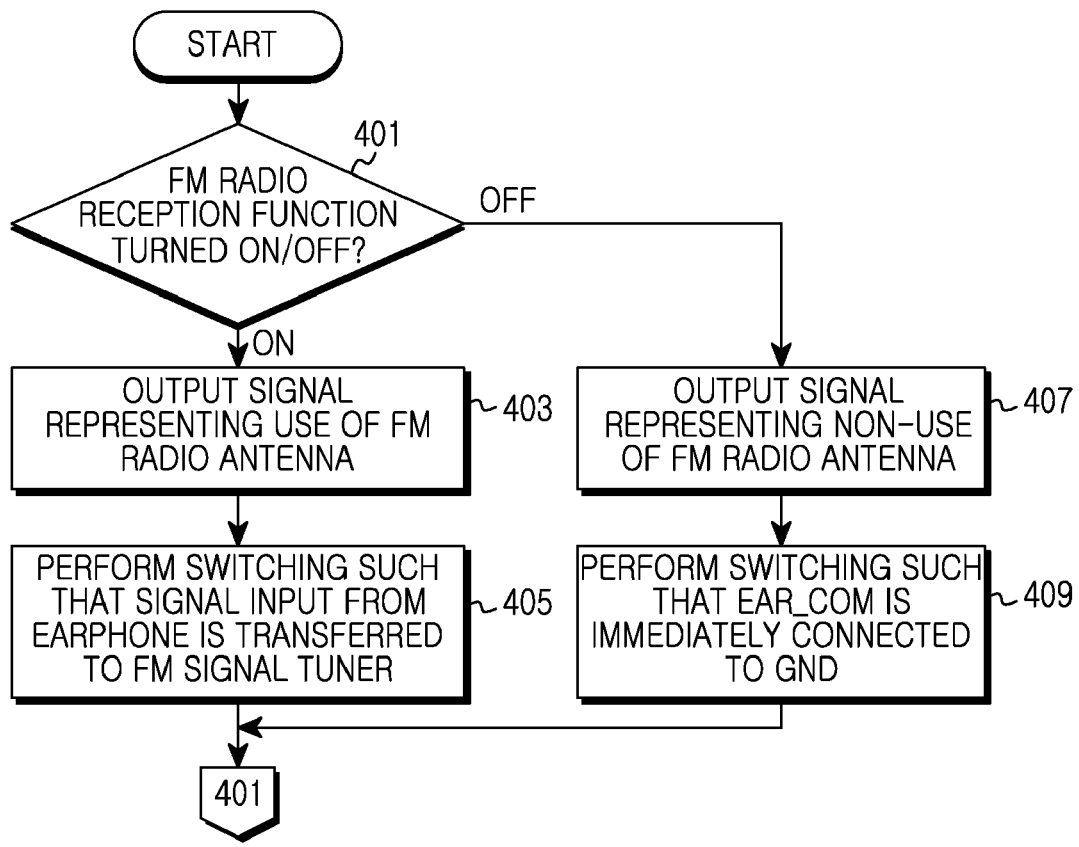
FIG. 4 is a flowchart illustrating an operation procedure of a mobile terminal that supports an earphone antenna according to an exemplary embodiment of the present invention.

FIG. 4 is a flowchart illustrating an operation of a mobile terminal that supports an earphone antenna according to an exemplary embodiment of the present invention.

Referring to FIG. 4, the mobile terminal determines whether an FM radio reception function is turned on or off in step 401. When the FM radio reception function is turned on, the mobile terminal outputs a signal representing the use of an FM radio antenna in order to receive the FM radio in step 403, and allows an FM signal input from an earphone antenna inserted into an ear jack to be transferred to an FM signal tuner via a switching unit between the ear jack and an FM signal tuner in step 405. The mobile terminal returns to step 401 to perform the subsequent steps again if the FM radio reception function is turned on.

In contrast, when the FM radio reception function is turned off, the mobile terminal outputs a signal representing non-use of the FM radio antenna in step 407 and allows EAR_COM 319 to be directly connected to GND via the switching unit between the ear jack and the FM signal tuner in step 409. Thereafter, the mobile terminal returns to step 401.

Though the case where the earphone antenna is inserted into the mobile terminal has been described in the above description, an earphone that does not support the FM radio antenna function or an external speaker may be inserted into the mobile terminal. In this case, since the FM radio reception function cannot be used, the switching unit 321 may perform switching such that EAR_COM 319 is directly connected to GND under control of the baseband 333.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

According to an exemplary embodiment of the present invention, a mobile terminal that supports an earphone antenna and commonly uses an EAR_COM port and an FM radio antenna port to selectively connects the EAR_COM port with GND through switching, so that cross-talk between audio channels may be reduced.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus for reducing cross-talk between audio channels in a mobile terminal, comprising:
   an ear jack having a common port for a reference potential of an earphone and a radio signal;
   a radio signal tuner for processing a radio signal input via the common port;
   a baseband for determining an on/off state of a radio reception function to output a control signal; and
   a switching unit for selectively coupling the common port of the ear jack to one of a ground and the radio signal tuner according to the control signal.

2. The apparatus of claim 1, wherein, when a control signal representing that the radio reception function is turned on is output from the baseband, the switching unit connects the common port with the radio signal tuner.

3. The apparatus of claim 1, wherein, when a control signal representing that the radio reception function is turned off is output from the baseband, the switching unit connects the common port to the ground.

4. A method for reducing cross-talk between audio channels in a mobile terminal, the method comprising:
   determining an on/off state of a radio reception function; and
   coupling a common port of an ear jack to one of a ground and a radio signal tuner for processing a radio signal according to an on/off state of the radio reception function,
   wherein the common port is intended for a reference potential of an earphone and radio signal reception.

5. The method of claim 4, wherein the coupling of the common port of the ear jack to one of the ground and the radio signal tuner comprises, connecting the common port with the radio signal tuner when the radio reception function is turned on.

6. The method of claim 4, wherein the coupling of the common port of the ear jack to one of the ground and the radio signal tuner comprises, connecting the common port with the ground when the radio reception function is turned off.

* * * * *